United States Patent [19]

Haghiri

[11] Patent Number: 4,766,490

[45] Date of Patent: Aug. 23, 1988

[54] METHOD OF AND DEVICE FOR ESTIMATING MOTION IN A SEQUENCE OF PICTURES

[75] Inventor: Mohammad-Reza Haghiri, Fontenay-aux-Roses, France

[73] Assignee: U.S. Philips Corp., New York, N.Y.

[21] Appl. No.: 934,048

[22] Filed: Nov. 24, 1986

[30] Foreign Application Priority Data

Nov. 22, 1985 [FR] France ..................... 85 17303

[51] Int. Cl.$^4$ .................... H04N 7/18; H04N 7/12
[52] U.S. Cl. ........................ 358/105; 358/136
[58] Field of Search ............. 358/105, 135, 136, 134

[56] References Cited

U.S. PATENT DOCUMENTS

| | | | |
|---|---|---|---|
| 4,218,703 | 8/1980 | Natravali et al. | 358/105 |
| 4,245,248 | 1/1981 | Natravali et al. | 358/105 |
| 4,371,895 | 2/1983 | Koga | 358/105 |
| 4,691,230 | 9/1987 | Kaneko et al. | 358/105 |
| 4,695,882 | 9/1987 | Wada et al. | 358/105 |
| 4,703,350 | 10/1987 | Hinman | 358/105 |

Primary Examiner—James J. Groody
Assistant Examiner—John K. Peng
Attorney, Agent, or Firm—Gregory P. Gadson

[57] ABSTRACT

Method of and device for estimating motion in a picture sequence, for use in compression of information to be transmitted or registered are disclosed. The method consists of: preserving the preceding picture with respect to the current picture; defining tree groups for the elements classified in fixed elements, moving elements and exposed elements, in which groups the elements are classified with a delay of L elements according to scanning of the picture; constructing a classification tree whose $3^L$ branches correspond to the sequence of possible groups for the L successive elements of the picture sequence; associating with each branch, a displacement vector representative of the possible displacement of the element with respect to the picture or to the preceding line and, a cumulated distortion representative of the cumulative sum of the classification errors of the preceding elements; in accordance with this procedure relating to L elements, taking a decision concerning the group and concerning the vector of the element situated L elements earlier.

5 Claims, 4 Drawing Sheets

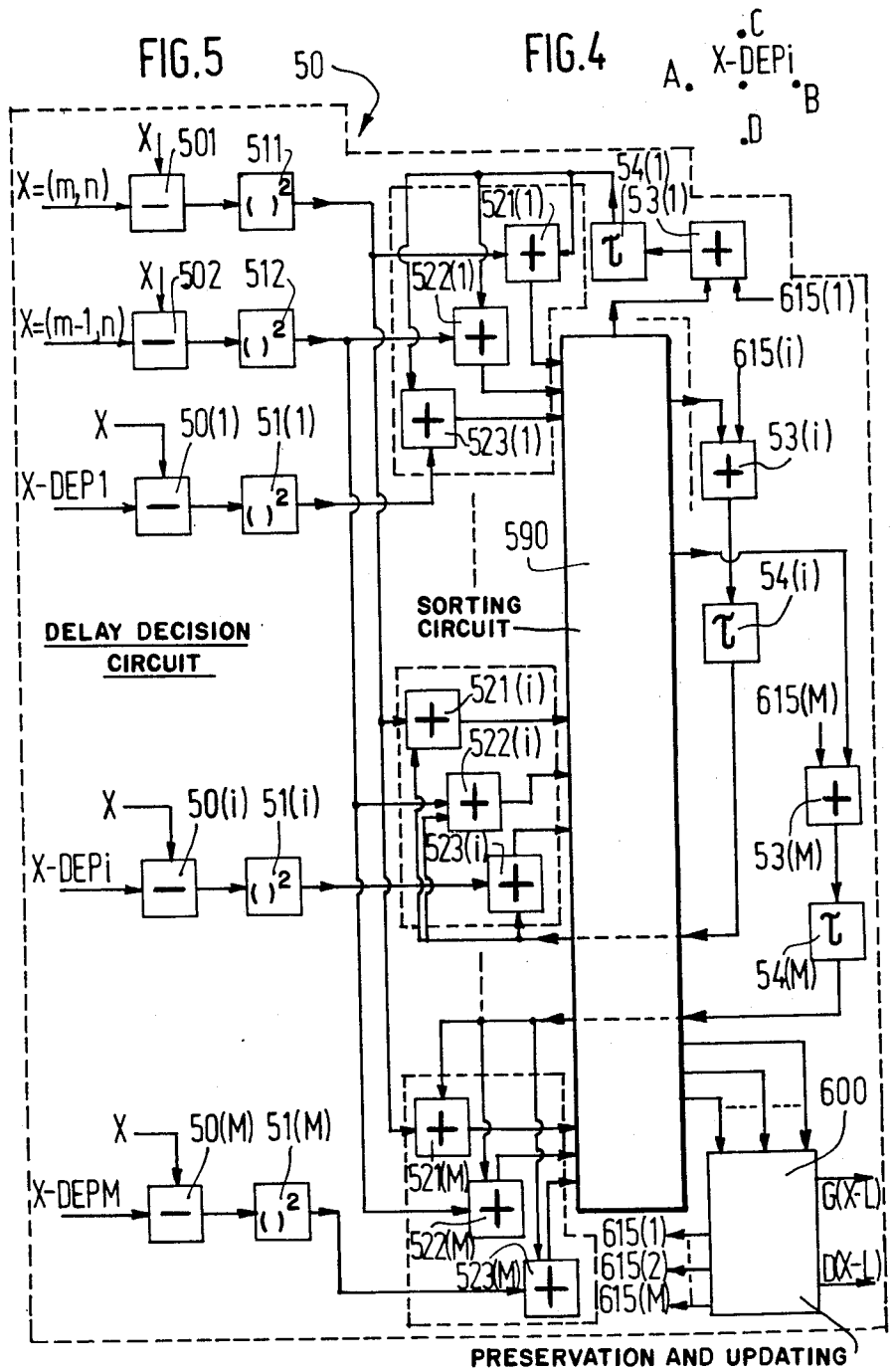

METHOD OF AND DEVICE FOR ESTIMATING MOTION IN A SEQUENCE OF PICTURES

BACKGROUND OF THE INVENTION

The present invention relates to a method of and a device for estimating motions in a sequence of pictures. Such a method is essentially applicable in the field of digital signal processing, for information compression, picture quality improvement, target tracking, etc. and, for example, in digital picture coding devices for the reduction of the rate of information to be transmitted or to be registered when, for example, magnetoscopes are concerned.

The article by A.N. Netravali and J.D. Robbins "Motion-Compensated Television Coding: Part I" published in the magazine "The Bell System Technical Journal", vol 58, no. 3, March 1979 describes a motion estimation method providing essentially for performing a classification of picture elements in fixed elements and moving elements and for estimating the motions by means of an adaptive prediction method utilizing elements of a preceding picture for comparing them in position and luminosity with those of the current picture. Yet, this method has considerable drawbacks. On the one hand, as far as the motion is concerned, it does not take into account the correlation between neighboring elements. Moreover, in the classification carried out, the influence of the classification relative to given picture elements on that of the following elements is not examined.

SUMMARY OF THE INVENTION

The object of the invention is to propose a method of estimating motion in a sequence of pictures remedying such drawbacks.

To this end, the invention relates to a method which is characterized in that the luminosity of each element is expressed in a digital form and each of these elements is defined by two coordinates (m,n) respectively, indicating the rank row of the picture line in which the element is present, and the row of the element on this $m^{th}$ line and in that it consists of:

(A) preserving the preceding picture with respect to the current picture for constituting a reference picture;

(B) defining three groups for the elements, classified in fixed elements, moving elements and exposed elements in which groups the elements are classified with a delay of L elements according to scanning of the picture by examining a given number of possible group sequences for the L elements succeeding the current element X considered and in accordance with a given classification criterion, said criterion for the fixed and moving elements being the difference in luminosity between two successive pictures taking the displacement of the elements of one picture with respect to the other into account for the moving elements, and being the difference in luminosity between two adjacent lines for the exposed elements;

(C) constructing a classification tree whose $3^L$ branches at each successive level are equal in number to those of the possible groups, and which correspond from the first to the $L^{th}$ level to the sequences of possible groups for the L considered successive elements of the picture sequence;

(D) associating two parameters with each branch of each level:

(a) a first parameter referred to as displacement vector representative of the possible displacement of the element with respect to the preceding picture or to the preceding line and determined by means of a recursive displacement estimation method;

(b) a second parameter referred to as cumulated distortion representative of the cumulative sum of the classification errors of the preceding elements, the groups of these elements being those of the tree branches traversed to arrive at the current branch, each classification error being rendered minimum by taking into account the influence of a displacement estimated for an element on the displacement estimated for the L following elements, said influence being only examined, among the $3^L$ possible branches of the tree, for M branches of the weakest cumulated distortion referred to as surviving branches, M being a limited number chosen to be substantially smaller than the maximum number of branches $3^L$;

(E) in accordance with this procedure relating to L elements, taking a decision of the majority type concerning the effective group and concerning the displacement vector of the element situated L elements earlier with respect to the current element, said decision being taken by examining the surviving branches and by classifying each element situasituated L elements earlier in the group to which the largest number of these surviving branches corresponds, the corresponding displacement vector being thus considered as the displacement of this element situated L elements earlier and the said decision procedure being identically repeated but for the L last elements of the picture sequence in which one avoids taking a decision.

The method thus proposed is advantageous in the sense that a different, more precise classification is achieved of picture elements involving a category referred to as exposed elements which permits of reinitializing the motion estimation method at the area of the contours of the moving objects. On the other hand, the possible correlation between elements is taken into account by awaiting the appearance of a given number of binary elements for taking a decision about the class of an element.

BRIEF DESCRIPTION OF THE DRAWINGS

The details and advantages of the invention will now appear in greater detail in the description which follows and in the accompanying drawings given by way of example, and in which:

FIG. 4 shows the four elements A, B, C, D whose luminosity is utilized for determining that of the element X-DEPi;

FIG. 5 shows an embodiment of the delay decision circuit provided in the device of FIG. 2;

DETAILED DESCRIPTION OF THE INVENTION

Figure 1:
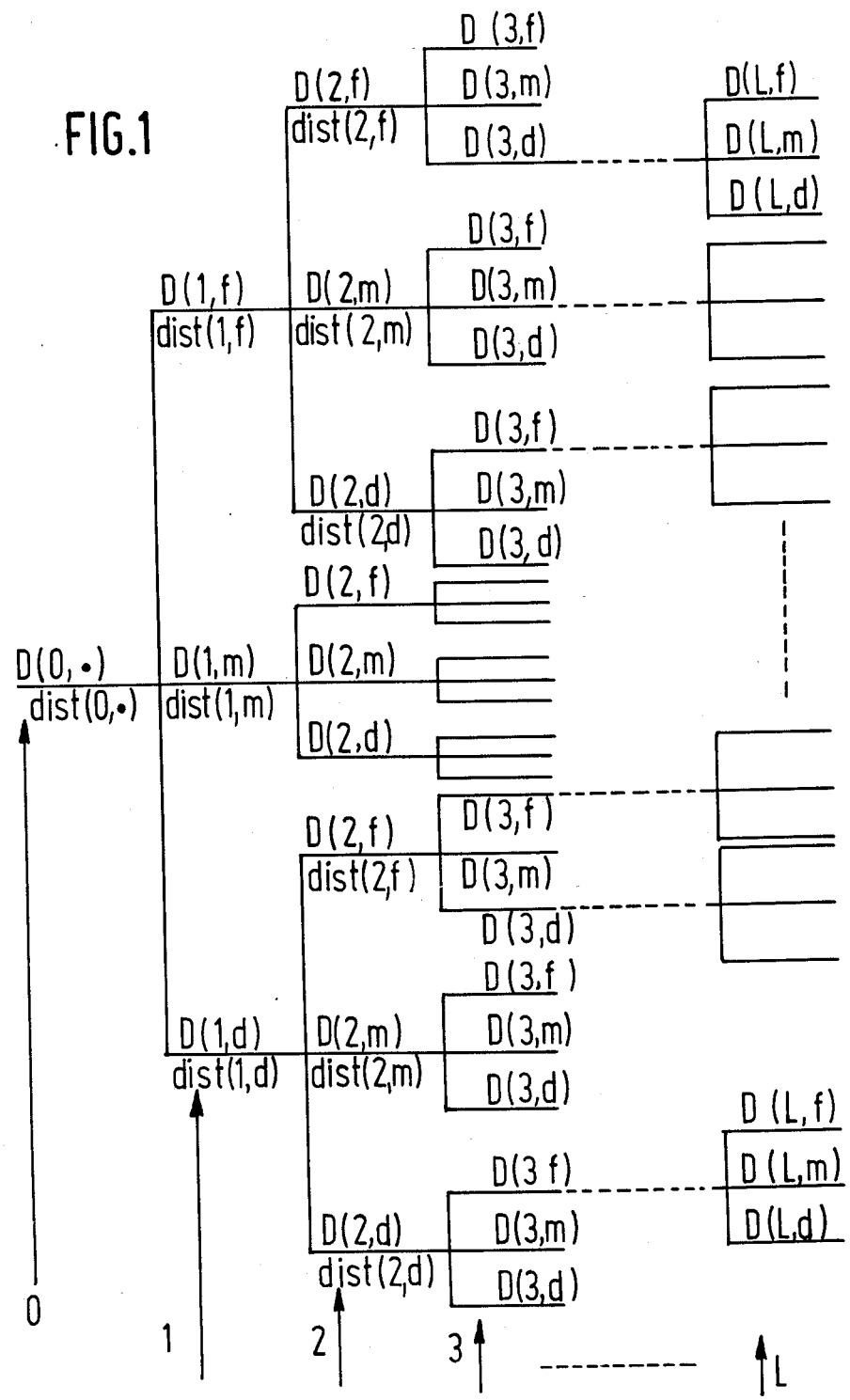
FIG. 1 shows an example of the classification tree of picture elements in which a distinction is made for each element between its possible relationship with a first group of fixed elements, a second group of moving elements or a third group referred to as exposed elements.

In numerous applications and notably in those mentioned above, it is necessary to treat numbered picture sequences, and more particularly to detect the existence of motion between one picture and the next. The method and device for estimating motion which will be described hereinafter is based on a recursive method of displacement estimation with a delay decision in order to initialize the estimator and to improve its performance. It is supposed that for each of the successive pictures, the value of the luminance of each picture element is digitized, and that each of these elements is defined by two coordinates (m, n), m being the row of the picture line and n being the element row on this $m^{th}$ line.

According to the invention, during scanning of the picture, the elements of this picture are classified with a delay of L elements in one of the three following groups:

(a) a group of fixed elements;
(b) a group of moving elements;
(c) a group of exposed elements.

The exact significance of this classification will be explained hereinafter. It can also be seen that the said classification is effected for each element by examining a given number of sequences of possible groups for the L elements following the element in question.

Also according to the invention, there is associated with each considered element, a displacement vector whose direction and amplitude are to be corrected from one element to the following as a function of the group of one or several preceding elements and of the classification error caused by this or these elements. This error is not defined in an identical manner for the three groups: for the two first groups mentioned it is equal to the difference in luminosity of the element and its homologue element in the preceding picture, taking into account the displacement which has taken place with respect to this preceding picture, while for the elements of the third group, the estimation error is determined by variation of the luminosity of the current picture in the vertical direction, that is to say, from one line to the other.

The classification performed as mentioned hereinbefore is based on the following considerations. When an object is displaced in a picture, three types of elements can be distinguished:

(a) the elements which are situated in a fixed part of the picture, or the fixed elements;
(b) the elements which are visible in two successive pictures but in different areas, or the moving elements;
(c) the elements which have become visible after the displacement of the object, or the elements qualified as being exposed. These exposed elements, which do not correspond to an element of the preceding picture, have a stronger spatial correlation and their luminous intensity, for example, is closer to that of the preceding line.

The objective classification criterion which will be adopted in this case is deduced from this distribution into three categories of elements, namely the difference in luminosity between two successive pictures for the two first types of elements, taking into account the displacement of the elements for the moving elements and the difference in luminosity between two adjacent lines for the third type of elements. For the purpose of efficiency, the recursive displacement evaluation method proposed is thus to distinguish the three defined element types, and is then to become interactive in an appropriate manner. The initialization of the estimation process must permit of ultimately recovering the displacement of the object by starting from an estimation of zero for the elements tracing the contour of the object in motion, that is to say, the displacement vector is not expected at its initialization for the elements forming this contour. Such elements should thus be classified in the third category of elements, that of the exposed elements.

Having defined a classification criterion, it is also ensured within the scope of the invention to minimize the classification error due to the non-optimum character of this criterion by examining, for simplicity's sake within a given limit, the influence of a displacement estimated for an element on the displacement estimated for the L following elements. This influence can be observed by constructing for this purpose a classification tree whose successive branches correspond to three possible groups with which L successive elements (in the scanning direction) of the picture are supposed to be associated. Such a tree theoretically comprises $3^L$ branches, but for the sake of simplicity of the device, it can be seen that the number of observed branches hereinafter referred to as surviving branches would be limited.

The simplified construction method of the classification tree is thus the following, defining the intersection of the various branches as the node and as a tree comprising L levels, each corresponding to a picture element. If we start from the first picture element it may a priori be associated with one of the three defined groups (the group of fixed elements, that of the moving elements, that of the exposed elements). In the classification tree shown in FIG.1, three branches relating to these three groups are thus created, and two parameters are associated with each branch.

The first of these parameters is the displacement vector denoted D (tree level; possible group), the level being between 0 and L, and the group being denoted by f, m or d (group of fixed elements, moving elements, exposed elements, respectively). For the two first groups, of elements this displacement vector is dependent on the one associated with the preceding node (in this case the zero node for the first of the L elements considered) and with respect to this preceding vector, it is re-updated by an estimation error D for distinguishing the classification error. For the third group, the displacement vector is simply equal to the said estimation error, which in this case is understood to mean the initialization of the motion estimator (when there is no preceding displacement vector), and thus in the same principle of the method is understood to mean the existence of a rupture in the recursive estimation character. The estimation error is itself proportional to the product of the spatial variation of the luminosity of the homologue element, taking the displacement in the preceding picture into account, and to the difference in luminosity between the current element and its homologue element in the preceding picture.

The second of these parameters is the cumulated distortion denoted dist (level of the tree, possible group) as described hereinbefore. In the present description, use will be made of the squared version of the cumulated sum of the classification errors of the preceding elements. The groups of these elements are those of the traversed branches in the classification tree to arrive at the current branch. In FIG. 1 a vector D (.,.) and a distortion dist (.,.) are associated with each branch, but in order not to crowd the Figure, not all these indications are shown because the sub-divisions of the tree are numerous.

If an example is taken for the first element of the sequence of pictures treated, this distortion is equal to the squared error of the branches of the first tree levels. Upon arrival at the second picture element, three branches are constructed in the tree at the extremity of each branch of the preceding level, and the new corresponding parameters (displacement vector, cumulated distortion) are calculated. This procedure is repeated for each new picture element, and the number of branches is multiplied by three, at least as long as this global number remains below a limit M of the number of authorized branches, which is substantially smaller than the number of maximum possible branches for each element. This limit is fixed in order to limit the complexity of the device. As soon as this number is exceeded, M branches of the weakest distortion, which are those referred to as surviving branches, are in the fact retained in the construction of the tree, whereas the $3^L$-M other branches are eliminated, for example, by giving their distortion an infinite value.

Such a procedure is continued until the $L^{th}$ picture element. Based on this procedure, after having retained the M branches of the weakest distortion, a majority type decision is taken concerning the effective group and the displacement vector of the first picture element. This decision is delayed because there is a waiting time for the information about L supplementary picture elements before taking the said decision on the considered element preceding the L elements. The decision is taken in the following manner: examining the surviving branches, the first element is classified in the group to which the largest number of these surviving branches corresponds and the corresponding displacement vector is considered as being the displacement of the first element, and so forth ..... From the $L^{th}$ element the method permits of determining, at the arrival of each new element, a group and a displacement vector which correspond to the element preceding this new element by L elements. For the L last picture elements or rather for the picture sequence when an entire sequence is chosen (for example, 25 picture in one second if one second of pictures is chosen to be treated), one simply avoids taking a majority decision.

Figure 2:
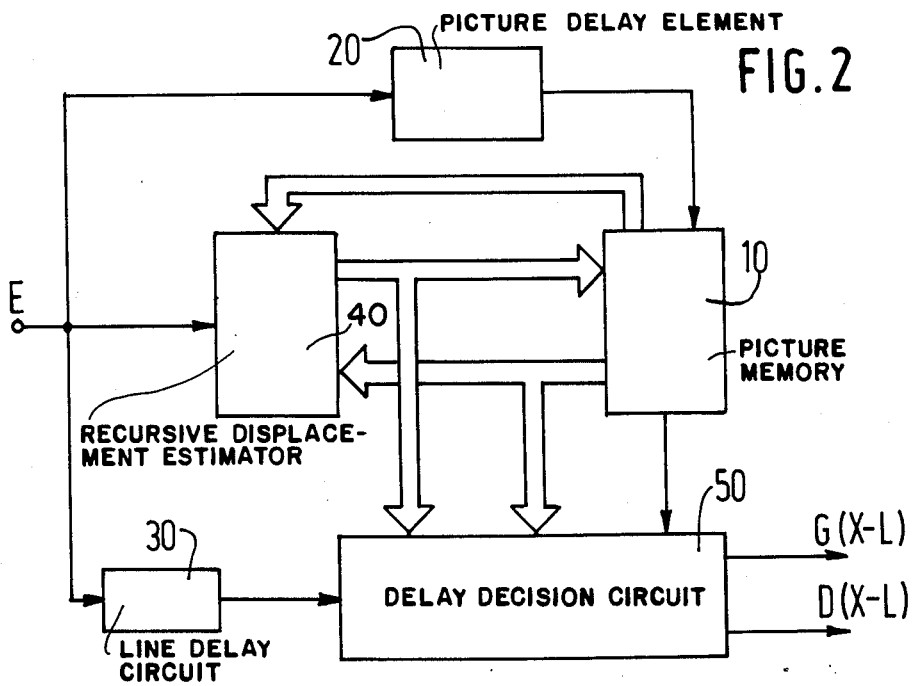
FIG. 2 shows an embodiment of an estimation device according to the invention.

FIG. 2 shows an embodiment of an estimation device permitting of carrying out the method. The device shown comprises an input connection E at which the digital samples constituting the input picture are present, (for example at a sampling frequency of 13.5 MHz in the case of a video picture). The input picture is applied at one end to a picture memory 10 which has the function of preserving the preceding picture during the processing of the current picture. A picture delay circuit 20 is disposed between the connection E and the input of the picture memory 10. On the other hand, the input picture is applied to a line delay circuit 30, which provides access to the corresponding element of the preceding line of the current picture (in the case of exposed elements of the third group). The input picture is finally applied to a recursive displacement estimator 40, which updates at each step in the classification tree, the displacement vectors related to the nodes of the tree. These M displacement vectors are applied to a delay decision circuit 50, which selects the best vector therefrom according to the majority decision process mentioned hereinbefore as being the displacement estimation of the element in question, which circuit 50 thus determines a group and a displacement vector for each element of the sequence of pictures but this decision occurs with a delay of L elements. The picture memory 10 which is intended to provide access to the elements of the preceding picture by taking into account the displacement vector receives from the recursive displacement estimator 40, the M displacement vectors (the same as those applied to the circuit 50) concerning the M successive nodes of the : classification tree and applies them to this estimator, a sampling period later and after an indirect address the luminosity of the homologue elements of the new current element X, the designation X symbolizing the coordinates m, n of the element, that is to say, of the elements X-DEP1, X-DEP1, X-DEP2, . . .,X-DEPM of the preceding picture. The memory 10 also provides the circuit 50 with this luminosity of the said homologue elements.

Figure 3:
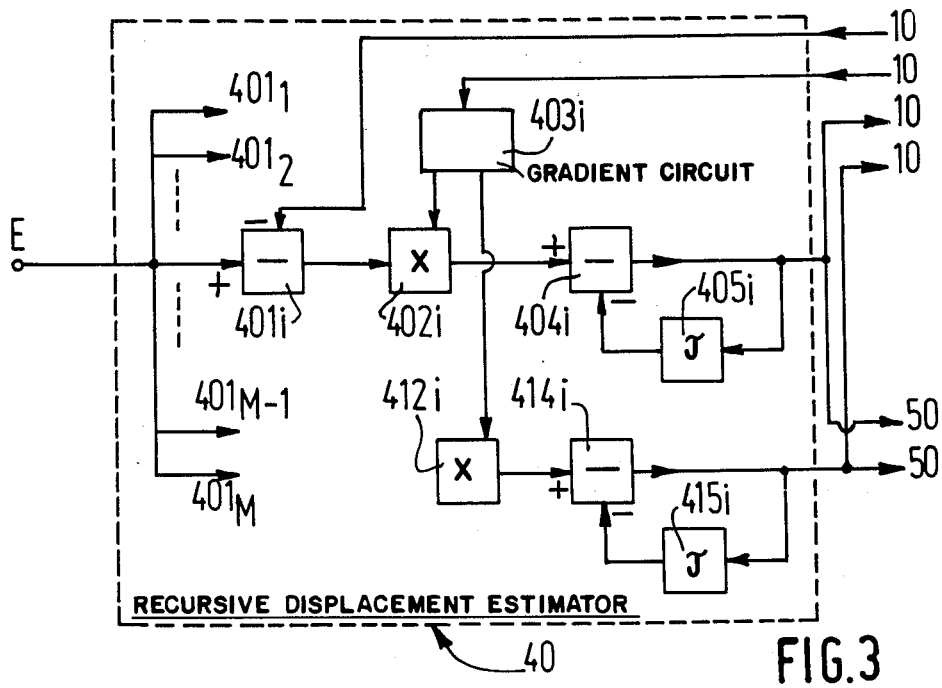
FIG. 3 shows an embodiment of the recursive displacement estimator provided in the device of FIG. 2.

FIG. 3 shows an embodiment of the recursive displacement estimator 40. This estimator 40 comprises M similar circuits each operating at one of the M outputs of the picture memory 10, and thus only one of the circuits composed of the elements 401$i$ to 415$i$ (i varying between 1 and M) is written. A subtractor 401$i$ receives at one end, for example, at its positive input, the input picture present at the input connection E and at the other end, at its negative input, the output signal of the picture memory 10, that is to say, the $i^{th}$ luminosity, and supplies as a difference signal, the difference in luminosity between the current element X and the homologue element X-DEPi of the preceding picture. This output signal of the subtractor 401$i$ is applied to two multipliers 402$i$ and 412$i$, making the product by means of the spatial gradient of the luminosity at the element X-DEPi, which spatial gradient itself is supplied in a vectorial form (gradient in the direction m, gradient in the direction n) by a gradient circuit 403$i$ which acts on the luminosity of the neighboring elements A, B, C, D of the element X-DEPi which is read in the picture memory 10. FIG. 4 shows these four elements A, B, C, D surrounding the element X-DEPi in the preceding picture and the said spatial gradient is given by the expression:

$$\mathrm{grad}(X\text{-}DEPi) = \tfrac{1}{2}\begin{bmatrix} A - B \\ C - D \end{bmatrix}$$

The vectorial output signal of the multipliers, which is the estimation error as defined hereinbefore, is then treated by two recursive filters without weighing, comprising subtractors 404$i$ and 414$i$ and element delay circuits 405$i$ and 415$i$. The circuit 405$i$ (or 415$i$) receives the output signal from the subtractor 404$i$ (or 414$i$) and reintroduces it in a delayed manner at the negative input of the latter, whose positive input receives the said estimation error and supplies the new displacement vector associated with the current element X considered.

The vectors DEP1, DEP2, . . . , DEPM, which are thus re-updated, are applied at one end to the picture memory 10 for the purpose of addressing, where they take the place of the preceding vectors and at the other end to the delay decision circuit 50 shown in FIG. 5 in a particular embodiment according to the invention.

This circuit 50 comprises in the first place (M+2) subtractor circuits 501, 502 and 50(1) to 50(M) which calculate the classification errors by means of estimation of the luminosity difference between the elements of the preceding picture and the elements of the current pictures, except for the subtractor 502, in which this difference is estimated between the elements of the preceding line and those of the current line; the figures between brackets in the references 50(1) to 50(M) designate the nodes of the classification tree. The values thus obtained are then squared in the (M+2) circuits 511, 512 and 51(1) to 51(M). The output signal of these squaring circuits is applied to 3M first adders 521(1) to 521(M), 522(1) to 522(M) 523(1) to 523(M) in the following manner: 511 to 521(1) to 521(M), 512 to 522(1) to 522(M), 51(1) to 51(M) to 523(1) to 523(M), respectively. The 3M adders receive at their other inputs the distortions of the nodes present at the outputs of the M delay circuits 54(1) to 54(M), which are themselves preceded by M adders 53(1) to 53(M). The role of these adders and delay circuits is described below.

The output signals of the 3M first adders represent the cumulated distortions of the 3M branches before elimination of 2M branches having the strongest distortion, and are applied to the sorting circuit 590. The latter is charged to sort among these 3M received signals those signals which represent the M weakest values of cumulated distortion and to apply them to the first inputs of the M adders 53(1) to 53(M) and to supply additionally these M distortion values and in conformity with each of them an index corresponding to the classification which they have at the input of the sorting circuit.

These M indices are subsequently utilized by a circuit 600 for preservation and updating of the classification tree. This circuit 600, which is shown in a particular embodiment in FIG. 6, comprises in the present case, a decoding circuit 601, which extracts the two data of the number of the branch (from which the group is deduced) and the number of the node, for example, with the aid of a read-only memory programmed to provide for each address between 1 and 3M, a quotient and a rest calculated as indicated hereinafter: after having multiplied each index by 2 and divided each index (thus multiplied) by three, the quotient is deducted (a) which indicates the number of the node (between 1 and M) of the last level of the classification tree and (b) is the rest which is equal to $\frac{1}{3}$, 0 or $\frac{2}{3}$, which are values made to correspond, respectively, to the group of the branch with which the distortion is associated, that is to said, the first group of the fixed elements, the second group of the moving elements or the third group of the exposed elements.

The preservation and updating circuit comprises also 2M principal registers 602(1), 602(2), . . ., 602(M), 603(1), 603(2), . . ., 603(M) and 2M auxiliary register 612(1), 612(2), . . ., 612(M), 613(1), 613(2), . . ., 613(M). These 4M shift registers each comprise L positions for L words with respect to the length (that is to say, to the number of levels) of the classification tree. The first of these registers (that is to say, the 2M principal registers) memorize the data which relate to the most recent level (that is to say, the current element X of the picture) and so forth. The M principal registers (602(1) to 602(M) and M auxiliary registers 612(1) to 612(M) memorize the displacement vectors for the L successive levels of the classification tree, while the M principal registers 603(1) to 603(M) and the M auxiliary registers 613(1) to 613(M) memorize for the L successive levels the data of the group of surviving branches. The contents of these registers permit of a reconfiguration of the classification tree in such a way that the nodes are arranged in a decreasing order of their distortion, which reconfiguration is carried out as will be described in greater detail hereinafter.

Figure 6:
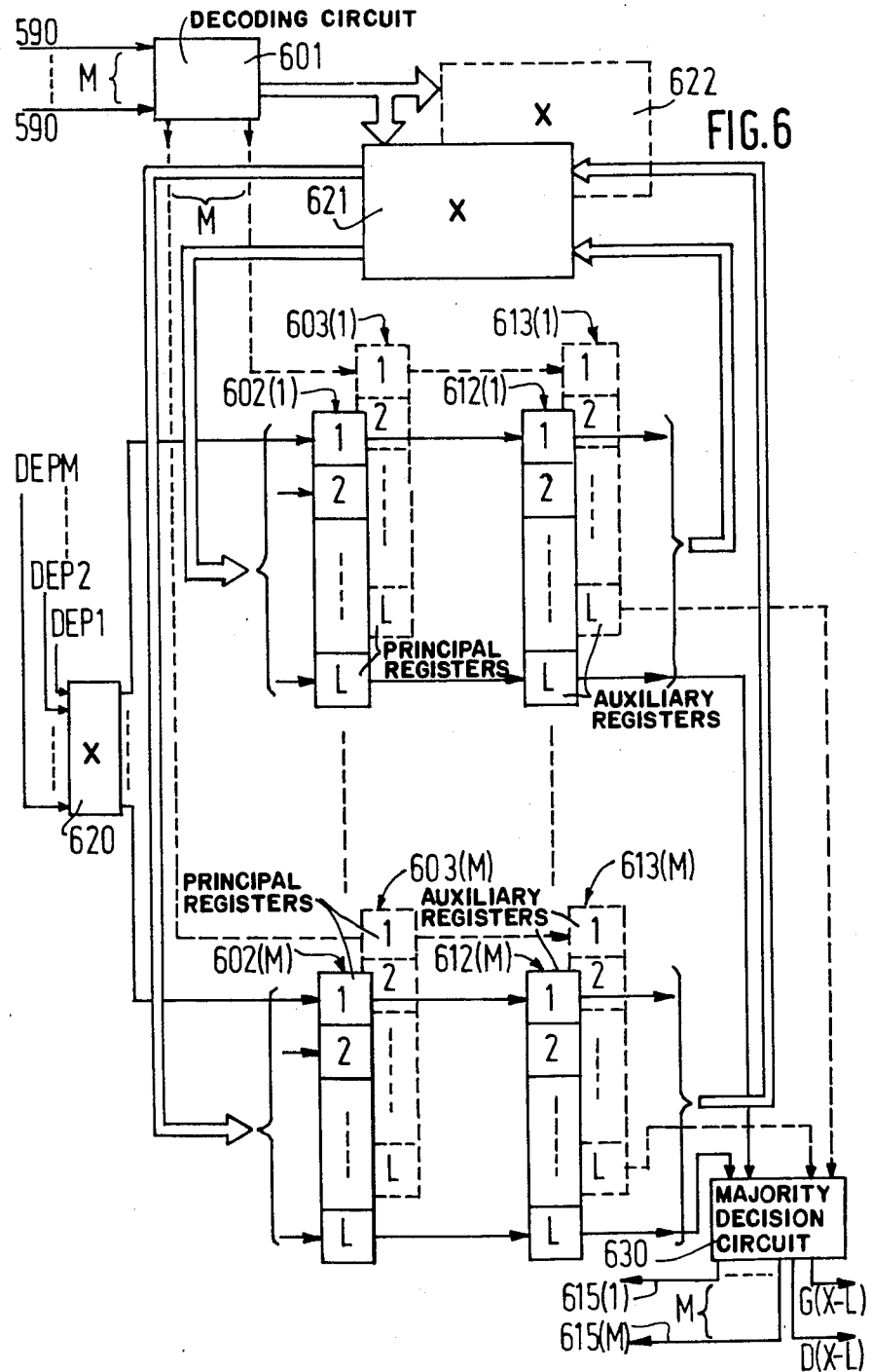
FIG. 6 shows an embodiment of a preservation and updating circuit provided in the circuit of FIG.5.

FIG. 6 shows at one end between the multiplier 621 and the principal registers 602(1) to 602(M) and at the other end between the auxiliary registers 612(1) to 612(M) and the same multiplier M respective transfer connections distinguished from the other tracks in the Figure in that they are each represented by means of a thicker arrow. M similar connections which would be shown in a manner exactly identical to the M connections mentioned above are are of course also present at one end between the multiplier 622 and the principal registers 603(1) to 603(M) and at the other end between the auxiliary registers 613(1) to 613(M) and this multiplier for permitting the same memorization, preservation, updating functions to be carried out as those authorized by the presence of M first connections. To simplify reading and comprehension of this FIG. 6, these M new connections between the elements 622, 603(1) to 603(M) and 613(1) to 613(M) are voluntarily omitted, and instead of showing these elements in solid lines they are shown in broken lines in the same way as the M connections leading from the decoder 601 to the registers 603(1) to 603(M), the M×L connections leading from the registers 603(1) to 603(M) to the registers 613(1) to 613(M) and the M connections leading from the registers 613(1) to 613(M) to the majority decision circuit 630.

For the reconfiguration in a first period, the contents of the 2M principal registers 602(1) to 602(M) and 603(1) to 603(M) are transferred in the 2M auxiliary registers 612(1) to 612(M) and 613(1) to 613(M), respectively, intended for preserving the classification tree before its reorganization. This transfer renders the 2M principal registers ready to receive the new configuration of the classification tree, without thereby losing the old tree. In a second period, the contents of the 2M auxiliary registers 612(1) to 612(M) and 613(1) to 613(M) are applied by means of the multipliers 621 and 622 (621 for the displacement vectors, 622 for the group data) to the 2M principal registers 602(1) to to 602(M) and 603(1) to 603(M) in order to store the said contents in the principal registers in a decreasing order of the associated distortions. The principal registers 602(K) and 603(K) comprise, for example, after these transfer operations the displacement vectors and the groups of the branch of the tree, respectively, whose distortion is the $K^{th}$ in the decreasing order thereof.

To introduce the data of the level X concerning the current element X, the two following operations are actually necessary:

(a) the first words of the M principal registers 603(1) to 603(M) are charged by the number of the group of branches of the level X (the level relative to the current element X), which itself originates from the decoding circuit 601 which in effect provides the rest of the division by 3 of the numbers of M nodes having the weakest distortion;

(b) the displacement vectors DEP1, DEP2, . . . DEP(M) originating from the circuit 40 by means of a multiplier circuit 620 are preserved in the first words of M principal registers 602(1) to 602(M) if the corresponding branches are associated with the group of fixed elements or with the group of moving elements, which words are rendered zero in the contrary case (initialization).

A delay decision is then taken by the majority decision circuit 630. This circuit in effect examines the $L^{th}$ words of the M principal registers 603(1) to 603(M) and determines the group whose number of occurrence is the largest (that is to say, the group which returns most frequently). If this is again the register 603(K), for example, which memorizes this group, the contents of the $L^{th}$ word of the principal registers 603(K) and 602(K) are considered as being the group G(X-L) and the displacement vector D(X-L) of the element X-L, respectively. It is these two data which are provided at the output of the majority decision circuit 630, that is to say, in fact at the output of the circuit 50 as indicated in FIG. 2. In order to eliminate the branches which do not lead to this group for the element X-L of the picture, when the content of the $L^{th}$ word differs from the group decided (itself indicated in the $L^{th}$ word of the register 603(K)), the cumulated distortion is given an infinite value or at least a very large value, for example, by the addition of a value which is higher than the maximum luminosity of the numbered picture.

Output signals 615(1) to 615(M) of the circuit 600, which are equal to the maximum luminosity for branches to be deleted and are equal to zero for the other branches, are applied to the second respective inputs of the M adders 53(1) to 53(M) succeeded by delay circuits 54(1) to 54(M), respectively. These delay circuits delay the signals which traverse them by one sampling period. With the final decision now taken, the words of the 2M principal registers 602(1) to 602(M) and 603(1) are shifted downwards and these registers are ready for a new delay decision operation, each decision being of course followed by a shift by one unit of the principal and auxiliary registers.

What is claimed is:

1. A method of estimating motion in a picture sequence in which the luminosity of each element is expressed in a digital form and each of these elements is defined by two coordinates (m,n), respectively, indicating the row of the picture line in which the element is present and the row of the element on this $m^{th}$ line, comprising:

(A) preserving the preceding picture with respect to the current picture for constituting a reference picture;

(B) defining three groups as fixed elements, moving elements and as exposed elements, in which groups the elements are classified with a delay of L elements according to scanning of the picture by examining a given number of possible group sequences for the L elements succeeding the current element X considered and in accordance with a given classification criterion, said criterion for the fixed and moving elements being the difference in luminosity between two successive pictures, taking the displacement of the elements of one picture with respect to the other into account for the moving elements, and the difference in luminosity between two adjacent lines for the exposed elements;

(C) constructing a classification tree whose $3^L$ branches at each successive level are equal in number to those of the possible groups and which correspond from the first to the $L^{th}$ level to the sequences of possible groups for the L considered successive elements of the picture sequence;

(D) associating two parameters with each branch of each level:

(a) a first parameter referred to as displacement vector representative of the possible displacement of the element with respect to the picture or to the preceding line and determined by means of a recursive displacement estimation method; and (b) a second parameter referred to as cumulated distortion representative of the cumulative sum of the classification errors of the preceding elements, the groups of these elements being those of the tree branches traversed to arrive at the current branch, each classification error being rendered minimum by taking into account the influence of a displacement estimated for an element on the displacement estimated for the L following elements, said influence being only examined, among the $3^L$ possible branches of the tree, for M branches of the weakest cumulated distortion referred to as surviving branches, where M is a limited number chosen to be substantially smaller than the maximum number of branches 3L;

(E) and in accordance with this procedure relating to L elements, taking a decision of the majority type concerning the effective group and concerning the displacement vector of the element situated L elements earlier with respect to the current element, said decision being taken by examining the surviving branches and by classifying each element situated L elements earlier in the group to which the largest number of these surviving branches corresponds, the corresponding displacement vector being thus considered as the displacement of this element situated L elements earlier, said decision procedure being identically repeated but for the L last elements of the picture sequence in which one avoids taking a decision.

2. An apparatus for estimating motion in a picture sequence in which the luminosity of each element is expressed in a digital form and each of these elements is defined by two coordinates (m,n), respectively, indicating the row of the picture line in which the element is present and the row of the element on this $m^{th}$ line, comprising:

(A) means for preserving the preceding picture with respect to the current picture for constituting a reference picture;

(B) means for defining three groups as fixed elements, moving elements and as exposed elements, in which groups the elements are classified with a delay of L elements according to scanning of the picture by examining a given number of possible group sequence for the L elements succeeding the current element X considered, and in accordance with a given classification criterion, said criterion for the fixed and moving elements being the difference in luminosity between two successive pictures, taking the displacement of the elements of one picture with respect to the other into account for the moving elements, and the difference in luminosity between two adjacent lines for the exposed elements;

(C) means for constructing a classification tree whose $3^L$ branches at each successive level are equal in number to those of the possible groups and which correspond from the first to the $L^{th}$ level to the sequences of possible groups for the L considered successive elements of the picture sequence;

(D) means for associating two parameters with each branch of each level:
  (a) a first parameter referred to as displacement vector representative of the possible displacement of the element with respect to the picture or to the preceding line and determined by means of a recursive displacement estimation method; and
  (b) a second parameter referred to as cumulated distortion representative of the cumulative sum of the classification errors of the preceding elements, the groups of these elements being those of the tree branches traversed to arrive at the current branch, each classification error being rendered minimum by taking into account the influence of a displacement estimated for an element on the displacement estimated for the L following elements, said influence being only examined, among the $3^L$ possible branches of the tree, for M branches of the weakest cumulated distortion refered to as surviving branches, where M is a limited number chosen to be substantially smaller than the maximum number of branches 3L;
and, (E) in accordance with this procedure relating to L elements, means for taking a decision of the majority type concerning the effective group and concerning the displacement vector of the element situated L elements earlier with respect to the current element, said decision being taken by examining the surviving branches and by classifying each element situated L elements earlier in the group to which the largest number of these surviving branches corresponds, the corresponding displacement vector being thus considered as the displacement of this element situated L elements earlier, said decision procedure being identically repeated but for the L last elements of the picture sequence in which one avoids taking a decision.

3. A device for estimating motion in a picture sequence provided for carrying out the method as claimed in claim 2 comprising a picture memory receiving the numbered picture sequence from its input connection via a picture delay circuit, a line delay circuit also receiving the numbered picture sequence and a recursive displacement estimator also receiving the numbered picture sequence for updating at each extension of the classification tree, the displacement vectors relative to the nodes of the tree, and for applying them to a delay decision circuit, said vectors being also applied to the picture memory which returns the luminosity of homologue elements of the current element X in the preceding picture to the said estimator and the said decision circuit.

4. A device as claimed in claim 3, wherein the delay decision circuit comprises:
  (A) (M+2) subtractor circuits of which the first and the M last calculate the classification errors by estimating the difference in luminosity between the element of the preceding picture and those of the current picture, the second subtractor calculating said error by estimating this difference between the elements of the preceding line and those of the current line;
  (B) (M+2) circuits for squaring the output signals of the subtractors;
  (C) 3M adders whose output signals represent the cumulated distortions of the 3M branches of the classification tree;
  (D) a sorting circuit receiving these 3M output signals, and delivering among these signals, those which represent the M weakest values of the cumulated distortion, said M selected signals being accompanied by an index corresponding to the classification of these signals at the inputs of the sorting circuit; and
  (E) a circuit for preserving and updating the classification tree receiving at one end the said M selected indices, and at the other end, the displacement vectors for the L successive levels of the classification tree, and supplying for the element preceding the current element X by L elements, the data relative to its group and its displacement vector.

5. A device as claimed in claim 4 wherein the preservation and updating circuit comprises:
  (A) a first set of M principal registers and M auxiliary registers all having L positions, the first being provided for memorization of the displacement vectors originating from the recursive displacement estimator by means of a multiplier circuit, and the second being provided for the preservation of these vectors before reorganization and the return of these vectors after reorganization in a decreasing order of the distortions to the said principal registers by means of a first multiplier;
  (B) a second set of M principal registers and M auxiliary registers all having L positions, the first being likewise provided for the memorization of the data from the group of surviving branches originating from the sorting circuit by means of a decoder for the L successive levels, and the second being provided for the preservation of these data of the group before reorganization and the return of these data after reorganization in a decreasing order of the distortions to the said principal registers by means of a second multiplier; and
  (C) a majority decision circuit intended to receive the contents of the $L^{th}$ words of the registers and to determine the group whose number of occurrence is the largest, the contents of those of the registers which memorizes this group being considered as the group G(X-L) of the element preceding the current element X by L elements, and the displacement vector in the corresponding principal register being also considered as the displacement vector D(X-L) of the said element preceding the current element X by L elements, and each of the decisions taken by the said majority decision circuit being followed by a shift by one unit of the principal and auxiliary registers.

* * * * *